United States Patent
Shinohara et al.

(10) Patent No.: US 8,815,469 B2
(45) Date of Patent: Aug. 26, 2014

(54) ELECTROLYTE, AND FUEL CELL, LI SECONDARY BATTERY, SECONDARY BATTERY AND PRIMARY BATTERY USING THE ELECTROLYTE

(75) Inventors: Akihiro Shinohara, Aichi-ken (JP); Naoki Hasegawa, Aichi-ken (JP); Koji Yamada, Shiga (JP); Susumu Yamaguchi, Shiga (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 381 days.

(21) Appl. No.: 13/189,994

(22) Filed: Jul. 25, 2011

(65) Prior Publication Data

US 2012/0028168 A1 Feb. 2, 2012

(30) Foreign Application Priority Data

Jul. 30, 2010 (JP) ................................. 2010-171465

(51) Int. Cl.
| | |
|---|---|
| *H01M 8/08* | (2006.01) |
| *H01M 10/0567* | (2010.01) |
| *H01M 8/10* | (2006.01) |
| *H01M 6/16* | (2006.01) |
| *H01M 12/06* | (2006.01) |
| *H01M 10/0568* | (2010.01) |

(52) U.S. Cl.
CPC .......... *H01M 10/0567* (2013.01); *Y02E 60/521* (2013.01); *Y02E 60/128* (2013.01); *H01M 8/1016* (2013.01); *H01M 6/168* (2013.01); *H01M 6/166* (2013.01); *H01M 12/06* (2013.01); *H01M 10/0568* (2013.01)
USPC ....................................................... 429/499

(58) Field of Classification Search
None
See application file for complete search history.

(56) References Cited

FOREIGN PATENT DOCUMENTS

| | | |
|---|---|---|
| JP | A-2001-302729 | 10/2001 |
| JP | A-2002-293842 | 10/2002 |
| JP | A-2007-335119 | 12/2007 |
| JP | A-2009-143975 | 7/2009 |
| JP | A-2009-173898 | 8/2009 |
| JP | A-2009-203455 | 9/2009 |
| JP | A-2009-256654 | 11/2009 |
| WO | WO 2010/055889 A1 | 5/2010 |

OTHER PUBLICATIONS

Kim_07 et al., Solvent-free, PYR1ATFSI ionic liquid-based ternary polymer electrolyte systems I. Electrochemical characterization, Journal of Power Sources 171 (2007) 861-869, Available online Jul. 17, 2007.*
Rymarczyk et al., A novel ternary polymer electrolyte for LMP batteries based on thermal cross-linked poly(urethane acrylate) in presence of a lithium salt and an ionic liquid, European Polymer Journal 44 (2008) 2153-2161, Available online Apr. 24, 2008.*
Appetecchi_09 et al., Effect of the alkyl group on the synthesis and the electrochemical properties of N-alkyl-N-methyl-pyrrolidinium bis(trifluoromethanesulfonyl)imide ionic liquids, Journal of Power Sources 54 (2009) 1325-1332, Available online Sep. 13, 2008.*
Kim_10 et al., UV cross-linked, lithium-conducting ternary polymer electrolytes containing ionic liquids, Journal of Power Sources 195 (2010) 6130-6137, Available online Nov. 10, 2009.*
Appetecchi_10 et al., Ternary polymer electrolytes containing pyrrolidinium-based polymeric ionic liquids for lithium batteries, Journal of Power Sources 195 (2010) 3668-3675, Available online Dec. 30, 2009.*
Tizzani et al., Electrochemical Properties of Polymer-LiX-Ionic Liquid Ternary Systems, Aust. J. Chem. 2007, 60, 47-50.*
David Valade et al., "Preparation of Solid Alkaline fuel Cell Binders Based on Fluorinated Poly(diallyldimethylammonium chloride)s[Poly(DADMAC)] or Poly(chlorotrifluoroethylene-co-DADMAC) Copolymers," *Journal of Polymer Science. Part A: Polymer Chemistry*, vol. 47, No. 8, 2009, pp. 2043-2058.
Nicholas J. Robertson et al., "Tunable High Performance Cross-Linked Alkaline Anion Exchange Membranes for Fuel Cell Applications," *Journal of the American Chemical Society*, 2010, 132, pp. 3400-3404.
M. Tomoi et al., "Synthesis and Thermal Stability of Novel Anion Exchange Resins with Spacer Chains," *Journal of Applied Polymer Science*, vol. 64, 1997, pp. 1161-1167.

Feb. 12, 2014 Office Action issued in Japanese Patent Application No. 2011-149525 (with partial translation).

* cited by examiner

*Primary Examiner* — Patrick Ryan
*Assistant Examiner* — Jose Colucci Rios
(74) *Attorney, Agent, or Firm* — Oliff PLC

(57) ABSTRACT

Provided is an electrolyte equipped with a hydrophilic portion having a cyclic quaternary ammonium salt and a hydrophobic portion bonded to the hydrophilic portion; and a fuel cell, a Li secondary battery, secondary battery and a primary battery using the electrolyte. The electrolyte has preferably a structure represented by the formula (A) or (B), wherein P' represents a hydrophobic portion, $R_1$ and $R_2$ each represents hydrogen, fluorine, a hydroxy group, or a hydrocarbon or fluorinated hydrocarbon group having from 1 to 10 carbon atoms, $R_3$ and $R_4$ each represents a hydrocarbon, fluorinated hydrocarbon, or a fluorocarbon group having from 1 to 10 carbon atoms, r and s each represents an integer of 0 or greater but not greater than 8 and satisfies $1 \leq r+s \leq 8$, u represents an integer and satisfies $2 \leq u \leq 9$, and $X^-$ represents a counter anion.

[Chemical formula 1]

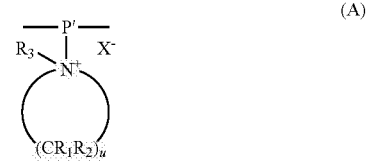

(A)

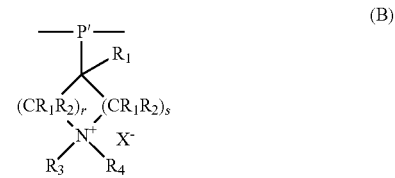

(B)

11 Claims, 1 Drawing Sheet

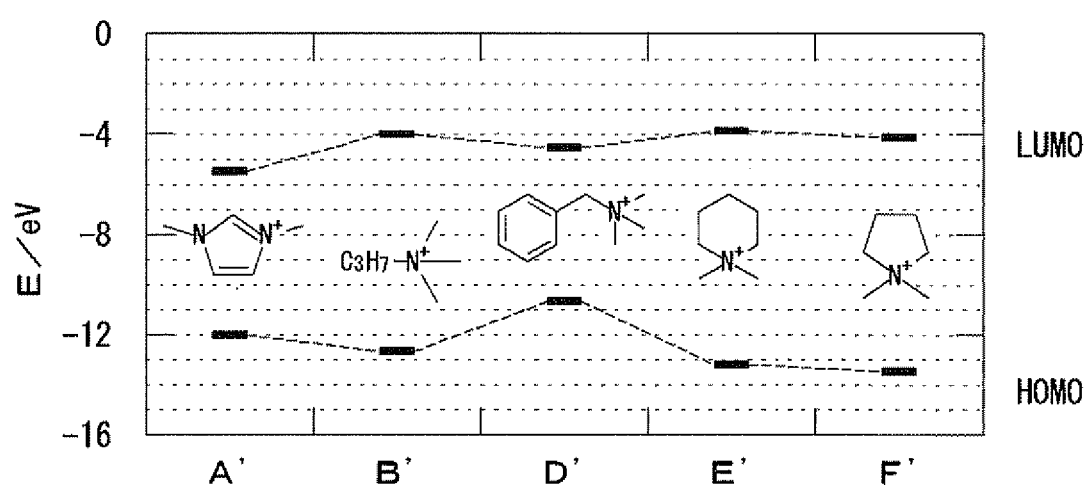

ELECTROLYTE, AND FUEL CELL, LI SECONDARY BATTERY, SECONDARY BATTERY AND PRIMARY BATTERY USING THE ELECTROLYTE

BACKGROUND OF THE INVENTION

The present invention relates to an electrolyte and a fuel cell, a Li secondary battery, a secondary battery and a primary battery using the electrolyte, more specifically, an electrolyte excellent in hydroxide ion conductivity and durability and a fuel cell, a Li secondary battery, a secondary battery and a primary battery using such an electrolyte.

Alkaline fuel cells are fuel cells using, as the electrolyte thereof, a hydroxide ion conductor such as an alkaline electrolyte or anion exchange polymer electrolyte.

Alkaline fuel cells are used in an alkaline atmosphere so that inexpensive electrode catalysts such as nickel can be used for them. In addition, they do not need an expensive separator such as Ti because the corrosion environment in the alkaline atmosphere is weaker than that in the acidic atmosphere. Alkaline fuel cells can therefore actualize cost reduction of a fuel cell system compared with solid polymer fuel cells using a proton exchange polymer electrolyte.

As to anion exchange polymer electrolytes usable as an electrolyte for alkaline fuel cells and production process thereof, various proposals have conventionally been made.

For example, Patent Document 1 discloses an allylamine-allylsulfonic acid copolymer which is not an anion exchange polymer electrolyte but contains a structural unit derived from monoallylamine or diallylamine and a structural unit derived from an allylsulfonic acid compound.

Patent Documents 2 and 3 disclose a crosslinked polymer containing a tertiary amine and/or a quaternary ammonium salt and having a tertiary amine structure at both ends of at least one crosslinked site.

According to these documents, a crosslinked polymer having such a structure is excellent in thermal decomposition resistance.

Patent Document 4 discloses a hydrocarbon-based anion exchange membrane available by:

(a) filling the void portion of a hydrocarbon-based porous film with a polymerizable composition containing a vinylcarboxylic acid amide, a crosslinkable polymerizable monomer, and a polymerization initiator and polymerizing and curing the polymerizable composition in the void portion, (b) hydrolyzing the carboxylic acid amide group into a corresponding amino group, and (c) converting the amino group into the corresponding quaternary ammonium salt by using an alkylating agent.

According to this document, the hydrocarbon-based anion exchange membrane having such a constitution has a high ion exchange capacity and high conductivity.

Patent Document 5 discloses an anion exchange resin having a styrene skeleton as a main chain and having an aromatic ring to which a quaternary ammonium group is bonded via an alkylene chain; and a hydrocarbon-based anion exchange membrane obtained by filling this anion exchange resin in the void portion of a porous film.

According to this document, a hydrocarbon-based anion exchange membrane having such a structure has a large ion exchange capacity, a high water content, and small membrane resistance.

Patent Document 6 discloses a polymer electrolyte composition which is not an anion exchange polymer electrolyte but contains a cation exchange resin having a sulfonic acid group and an anion exchange resin having at least one heterocyclic group containing a cationic nitrogen atom.

According to this document, the polymer electrolyte composition having excellent flexibility while having practically sufficient proton conductivity can be obtained by adding a small amount of an anion exchange resin to a cation exchange resin.

Non-patent Document 1 discloses a copolymer of diallylamine and $CF_2CFCl$. According to this document, the resulting copolymer has excellent high-temperature durability (Tg: exceeding 200° C.) but low $OH^-$ conductivity.

Non-patent Document 2 discloses a process of subjecting a cyclooctene ring added with a quaternary ammonium salt to ring opening metathesis polymerization.

Further, it is generally known that an anion exchange resin containing a benzyltrimethyl ammonium portion is thermally instable under alkali conditions. For example, Non-patent Document 3 has reported that a residual ratio of such an anion exchange resin is 79% after placed under the conditions of 100° C. for 13 days.

It is the common practice to use, as a polymer electrolyte to be used for alkaline fuel cells, an anion exchange resin obtained by introducing an alkyl halide group such as benzyl chloride in a phenyl portion of a polystyrene structure or the like and then quaternizing the resulting product with trimethylamine. An anion exchange resin equipped with such a structure, however, lacks long-term durability because the benzyl position (or alkyl chain) at which the trimethylamine group is bonded to a phenyl group drops off as a result of thermal decomposition.

In particular, when an anion exchange resin equipped with this structure is used as an electrolyte for alkaline fuel cells, use of hydrazine as a fuel causes oxidation of the benzyl position or alkyl portion with hydrazine and oxygen and facilitates elimination of an ion group (trimethylamine). As a result, hydroxide ion conductivity of the electrolyte decreases, leading to lack of long-term durability.

PATENT DOCUMENTS

[Patent Document 1] Japanese Patent Application Laid-Open No. 2002-293842
[Patent Document 2] Japanese Patent Application Laid-Open No. 2001-302729
[Patent Document 3] Japanese Patent Application Laid-Open No. 2009-143975
[Patent Document 4] Japanese Patent Application Laid-Open No. 2009-173898
[Patent Document 5] Japanese Patent Application Laid-Open No. 2009-203455
[Patent Document 6] Japanese Patent Application Laid-Open No. 2009-256654

NON-PATENT DOCUMENTS

[Non-patent Document 1] Journal of Polymer Science Part A Polymer Chemistry, 2009, vol. 47, No. 8, 2043-2058
[Non-patent Document 2] Journal of the American Chemical Society, 2010, 132, 3400-3404
[Non-patent Document 3] Journal of Applied Polymer Science, 1997, vol. 64, 1161-1167

SUMMARY OF THE INVENTION

An object of the invention is to solve the above-described problems and provide a novel electrolyte excellent in hydroxide ion conductivity and durability and a fuel cell, a Li secondary battery, a secondary battery and a primary battery using the electrolyte.

An electrolyte of the invention provided for solving the above-described problems is equipped with a hydrophilic portion having a cyclic quaternary ammonium salt and a hydrophobic portion bonded to the hydrophilic portion, with the proviso that an electrolyte used for a hydrazine fuel cell is excluded.

The electrolyte of the invention is preferably equipped with a structure represented by the following formula (A) or (B):

[Chemical formula 1]

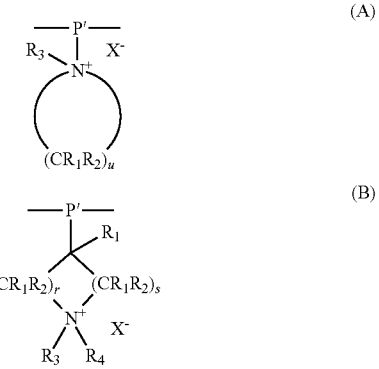

wherein,
P′ represents the hydrophobic portion,
$R_1$ and $R_2$ each represents hydrogen, fluorine, a hydroxy group, or a hydrocarbon group or fluorinated hydrocarbon group having from 1 to 10 carbon atoms, and the hydrocarbon group or fluorinated hydrocarbon group constituting $R_1$ or $R_2$ may each contain an ether bond, a sulfonyl bond, and/or a hydroxy group,
$R_3$ and $R_4$ each represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ or $R_4$ may each contain an ether bond, a sulfonyl bond, and/or a hydroxy group,
r and s each represents an integer of 0 or greater but not greater than 8 and satisfy $1 \leq r+s \leq 8$,
u represents an integer satisfying $2 \leq u \leq 9$, and
$X^-$ represents a counter anion.

The electrolyte of the invention is preferably equipped with a structure represented by the following formula (C) or (D):

[Chemical formula 2]

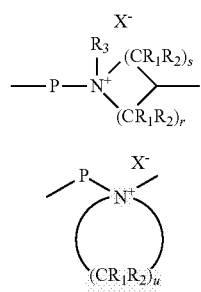

wherein,
P represents the hydrophobic portion,
$R_1$ and $R_2$ each represents hydrogen, fluorine, a hydroxy group, or a hydrocarbon group or fluorinated hydrocarbon group having from 1 to 10 carbon atoms, and the hydrocarbon group or fluorinated hydrocarbon group constituting $R_1$ or $R_2$ may contain an ether bond, a sulfonyl bond, and/or a hydroxy group,
$R_3$ represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ may each contain an ether bond, a sulfonyl bond, and/or a hydroxy group,
r and s each represents an integer of 0 or greater but not greater than 8 and satisfies $1 \leq r+s \leq 8$,
u represents an integer satisfying $2 \leq u \leq 9$, and
$X^-$ represents a counter anion.

The electrolyte of the invention is preferably equipped with a structure represented by the following formula (E), (F), or (G):

[Chemical formula 3]

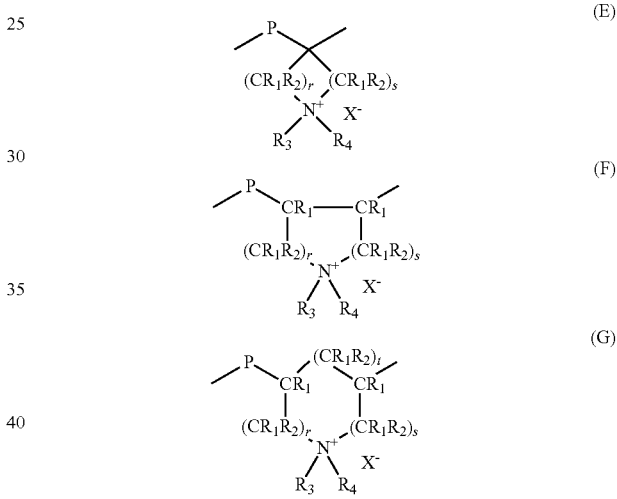

wherein,
P represents the hydrophobic portion,
$R_1$ and $R_2$ each represents hydrogen, fluorine, a hydroxy group, or a hydrocarbon group or fluorinated hydrocarbon group having from 1 to 10 carbon atoms, and the hydrocarbon group or fluorinated hydrocarbon group constituting $R_1$ or $R_2$ may contain an ether bond, a sulfonyl bond, and/or a hydroxy group,
$R_3$ and $R_4$ each represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ or $R_4$ may each contain an ether bond, a sulfonyl bond, and/or a hydroxy group,
r and s each represents an integer of 0 or greater but not greater than 8,
t represents an integer of 1 or greater but not greater than 7,
in the formula (E), r and s satisfy $1 \leq r+s \leq 8$,
in the formula (F), r and s satisfy $0 \leq r+s \leq 7$, with the proviso that r and s do not represent 1 simultaneously,
in the formula (G), r, s, and t satisfy $1 \leq r+s+t \leq 7$, with the proviso that r, s, and t do not represent 1 simultaneously, and
$X^-$ represents a counter anion.

A fuel cell of the invention is characterized in that it uses the electrolyte of the invention.

A Li secondary battery of the invention is characterized in that it uses the electrolyte of the invention.

A secondary battery of the invention is characterized in that it uses the electrolyte of the invention.

A primary battery of the invention is characterized in that it uses the electrolyte of the invention.

The electrolyte of the invention is equipped with a cyclic quaternary ammonium salt so that it has relatively high hydroxide ion conductivity. In addition, it has, at the ion conducting portion thereof, a cyclic structure so that it has high durability.

BRIEF DESCRIPTION OF THE DRAWING

FIG. 1 shows a HOMO level and a LUMO level of various model compounds determined through theoretical calculation.

DETAILED DESCRIPTION OF THE INVENTION

An embodiment of the invention will next be described specifically.

[1. Electrolyte]
[1.1. Constitution]

The electrolyte of the invention is equipped with a hydrophilic portion and a hydrophobic portion, with the proviso that an electrolyte for hydrazine fuel cell is excluded.

[1.1.1. Hydrophilic Portion]

The term "hydrophilic portion" means a segment having a cyclic quaternary ammonium salt. The electrolyte of the invention may have, in the polymer chain thereof, any one hydrophilic portion or two or more hydrophilic portions.

The term "cyclic quaternary ammonium salt" means:

(1) a compound represented by the formula: $N^+R_4$ (each R represents a hydrocarbon group, a fluorinated hydrocarbon group, or a fluorocarbon group) wherein at least two Rs form a cyclic structure, (2) among four Rs forming the cyclic quaternary ammonium salt, Rs forming the cyclic structure are made of a hydrocarbon group or a fluorinated hydrocarbon group, (3) among four Rs forming the cyclic quaternary ammonium salt, Rs not forming the cyclic structure are made of a hydrocarbon group, a fluorinated hydrocarbon group, or a fluorocarbon group.

Accordingly, the cyclic quaternary ammonium salts include neither compounds having an iminium cation (unsaturated bond of $N^+=C$) structure nor aromatic cations (such as imidazolium and pyridinium).

The term "hydrocarbon group" as used herein means a group containing a C—H bond and not containing a C—F bond in the structure of the group.

The term "fluorinated hydrocarbon group" as used herein means a group obtained by substituting some of the hydrogen atoms bonded to the carbon atom of the hydrocarbon group with a fluorine atom, that is, a group having, in the structure thereof, both a C—H bond and a C—F bond.

The term "fluorocarbon group" means a group obtained by substituting all the hydrogen atoms bonded to the carbon atom of the hydrocarbon group with a fluorine atom, that is, a group having, in the structure thereof, only a C—F bond.

Rs may each contain an ether bond, a sulfonyl bond, and/or a hydroxy group. When R contains a hydroxy group, the hydroxy group is preferably a tertiary alcohol in order to prevent oxidation.

The structure of the substituent of each R is not particularly limited and it may be a linear structure or a cyclic structure. Further, the substituent of each R may contain an aromatic group.

The number of atoms constituting the ring may be at least three. In general, the greater the number of atoms constituting the ring, the greater the EW. The number of atoms constituting the ring is preferably 10 or less in order to achieve high ion conductivity.

In addition, the number of carbon atoms of each R is not particularly limited and can be selected freely, depending on the purpose. In general, the greater the number of carbon atoms contained in R, the greater the EW and the smaller the ion conductivity. It is therefore preferred to select the optimum number of carbon atoms contained in each R in order to achieve practically sufficient ion conductivity.

Specific examples of the cyclic quaternary ammonium salt include those represented by the following formulas (a.1) to (a.8). In the electrolyte of the invention, the cyclic quaternary ammonium salt is bonded to a polymer chain via any one of N or C constituting the ring, or R bonded to N.

The cyclic quaternary ammonium salt containing an aromatic ring as represented by the formula (a.8) has preferably, at a benzyl position thereof, a quaternary carbon (substituted with a substituent other than hydrogen) in order to prevent an oxidation reaction of the benzyl position (carbon bonded to the aromatic ring).

[Chemical formula 4]

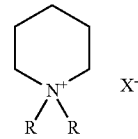

(a.1)

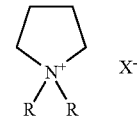

(a.2)

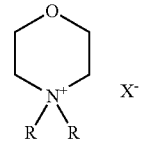

(a.3)

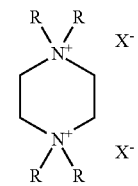

(a.4)

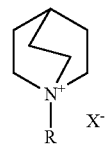

(a.5)

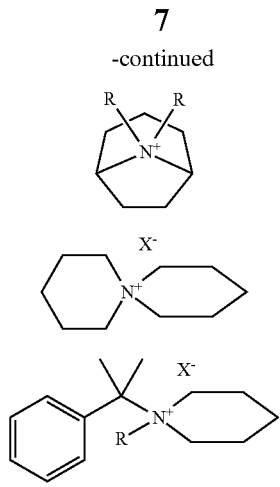

(a.6)

(a.7)

(a.8)

[Chemical formula 5]

(A)

(B)

[1.1.2. Hydrophobic Portion]

The term "hydrophobic portion" means a segment not having a hydrophilic group. The electrolyte of the invention may be equipped with, in the polymer chain thereof, any one or more hydrophobic portions.

The hydrophobic portion may be either one of a hydrocarbon segment and a fluorocarbon segment. Or, the hydrophobic portion may be a segment (fluorinated hydrocarbon segment) obtained by substituting some of hydrogen atoms bonded to the carbon atom of the hydrocarbon segment with a fluorine atom. The structure of the hydrophobic portion is not particularly limited and may be a linear structure or a cyclic structure.

[1.1.3. Molecular Structure]

The hydrophilic portion may be bonded to the hydrophobic portion via any one atom forming the cyclic structure. Or, the hydrophilic portion may be bonded to the hydrophobic portion via any two or more atoms forming the cyclic structure.

Moreover, the cyclic quaternary ammonium salt may be bonded to the hydrophobic portion so that some of the constituent elements of the ring form the polymer chain (main chain). Or, the cyclic quaternary ammonium salt may be bonded, in the form of a side chain, to the main chain.

Further, the nitrogen atom constituting the ring has four linking bonds. At least two of them are used for forming the cyclic structure. The remaining two are used for bonding to the hydrophobic portion or bonding to an organic group constituting the hydrophilic portion. They may, however, be used for crosslinking with another polymer chain. Even if the cyclic quaternary ammonium salt has a crosslinked structure, the nitrogen constituting the ring functions as a quaternary ammonium ion (hydroxide ion conductor).

[1.2. Specific Example 1]

As the first specific example of the electrolyte of the invention, electrolytes represented by the following formula (A) and formula (B) are shown. The electrolytes represented by the formula (A) and formula (B) are each equipped with a structure in which a cyclic quaternary ammonium salt is bonded to, in the form of a side chain, the hydrophobic portion P'.

In the electrolyte represented by the formula (A), a ring and P' are bonded to each other via the nitrogen atom of the ring. In the electrolyte represented by the formula (B), on the other hand, a ring and P' are bonded to each other via the carbon atom of the ring.

wherein,

P' represents the hydrophobic portion, $R_1$ and $R_2$ each represents hydrogen, fluorine, a hydroxy group, or a hydrocarbon group or fluorinated hydrocarbon group having from 1 to 10 carbon atoms, and the hydrocarbon group or fluorinated hydrocarbon group constituting $R_1$ or $R_2$ may each contain an ether bond, a sulfonyl bond, and/or a hydroxy group, $R_3$ and $R_4$ each represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ or $R_4$ may each contain an ether bond, a sulfonyl bond, and/or a hydroxy group, r and s each represents an integer of 0 or greater but not greater than 8 and satisfies $1 \leq r+s \leq 8$, u represents an integer satisfying $2 \leq u \leq 9$, and $X^-$ represents a counter anion.

[1.2.1. P']

The P' represents the hydrophobic portion and it may any of a hydrocarbon group, a fluorinated hydrocarbon group, or a fluorocarbon group.

Examples of the hydrophobic portion P' include those represented by the following formulas (2.1) to (2.6). In the formulas (2.1) to (2.6), n represents an integer of 1 or greater, m represents an integer of 0 or greater, Y represents a direct bond or an oxygen atom, and b represents an integer of 1 or greater but not greater than 4. The electrolyte may contain any one of them or two or more of them as the hydrophobic portion P'.

[Chemical formula 6]

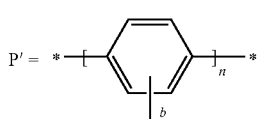

(2.1)

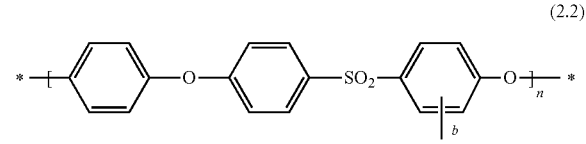

(2.2)

(2.3)

\*―[CF₂―CF]ₙ―\*
          |
          Y
          |
       (CH₂)ₘ
          |

(2.4)

\*―[CH₂―CH]ₙ―\*
          |
          Y
          |
       (CH₂)ₘ
          |

(2.5)

\*―[CH₂―CH]ₙ―\*
          |
         (phenyl with b substituents)

(2.6)

\*―[C=CH]ₙ―\*
      |
      Y
      |
   (CH₂)ₘ
      |

In the above formulas, n and m each represents the number of repeating units. They are not particularly limited and can be selected freely, depending on the purpose. An excessive increase in the value of n or m leads to an increase in EW so that n and m are preferably 10 or less.

In the above formulas, b represents the number of hydrophilic groups bonded to an aromatic ring. The number of hydrophilic groups bonded to respective aromatic rings may be the same or they may be different among repeating units.

A portion of the hydrophobic portion P' having a carbon-carbon double bond can be converted into a single bond through hydrogen reduction. The hydrogen reduction may be performed using the common method, for example, catalytic hydrogenation with a metal catalyst or a hydride reduction process.

[1.2.2. P]

The electrolyte represented by the formula (A) or (B) may be equipped further with a hydrophobic portion P bonded to the hydrophobic portion P'. The structure of the hydrophobic portion P is not particularly limited and it may have various structures.

Examples of the hydrophobic portion P include those represented by the following formulas (1.1) to (1.12). In the formulas (1.1) to (1.12), p represents an integer of 1 or greater. The electrolyte may contain any one of them or may contain two or more of them as the hydrophobic portion P.

[Chemical formula 7]

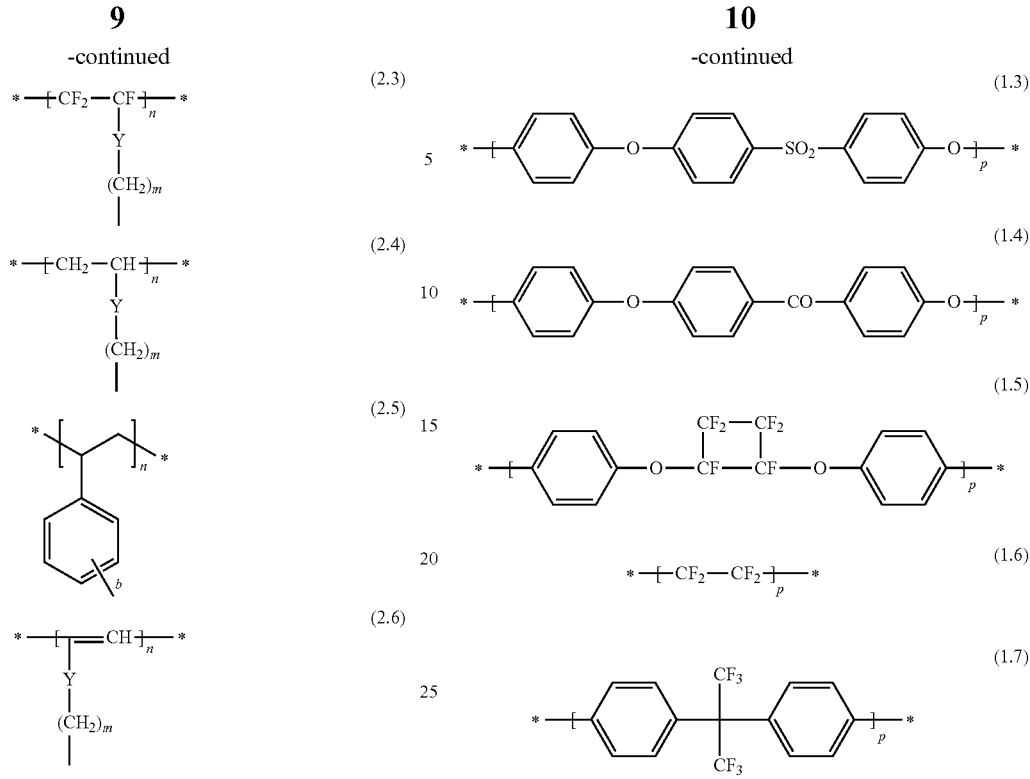

$P = $ \*―[CH₂―CH₂]ₚ―\* (1.1)

(1.2)

(1.3)

(1.4)

(1.5)

(1.6)

(1.7)

(1.8)

(1.9)

―O― (1.10)

―SO₂― (1.11)

\*―[CH=CH]ₚ―\* (1.12)

In the above formulas, p represents the number of repeating units. The value of p is not particularly limited but can be selected freely, depending on the purpose. Described specifically, the electrolyte may be a random copolymer or an alternate copolymer having a low molecular weight hydrophobic portion and a low molecular weight hydrophilic portion bonded to each other, or may be a block copolymer having a high molecular weight hydrophobic portion and a high molecular weight hydrophilic portion bonded to each other.

The electrolyte may contain any one of them or may contain two or more of them as the hydrophobic portion P.

A portion of the hydrophobic portion P having a carbon-carbon double bond can be converted into a single bond through hydrogen reduction. The hydrogen reduction may be performed using a common method, for example, catalytic hydrogenation with a metal catalyst or a hydride reduction process.

[1.2.3. $R_1$ and $R_2$]

In the above formulas, $R_1$ and $R_2$ each represents a substituent on the carbon atom constituting the cyclic quaternary ammonium salt. $R_1$ and $R_2$ are each composed of hydrogen, fluorine, a hydroxy group, a hydrocarbon group, or a fluorinated hydrocarbon group. When $R_1$ or $R_2$ represents a hydrocarbon group or a fluorinated hydrocarbon group, the hydrocarbon group or the fluorinated hydrocarbon group may contain an ether bond, a sulfonyl bond, and/or hydroxy group.

When $R_1$ or $R_2$ represents a hydrocarbon group or a fluorinated hydrocarbon group and it contains a hydroxy group, the hydroxy group is preferably in the form of a tertiary alcohol.

Further, when $R_1$ or $R_2$ represents a hydrocarbon group or a fluorinated hydrocarbon group, it has preferably from 1 to 10 carbon atoms in order to achieve high ion conductivity.

The structure of $R_1$ or $R_2$ is not particularly limited and it may contain a linear structure, cyclic structure, or aromatic ring.

[1.2.4. $R_3$ and $R_4$]

In the above formulas, $R_3$ and $R_4$ each represents a substituent on the nitrogen atom constituting the cyclic quaternary ammonium salt. $R_3$ and $R_4$ are each composed of a hydrocarbon group, a fluorinated hydrocarbon group or a fluorocarbon group. The hydrocarbon group, fluorinated hydrocarbon group, or fluorocarbon group may contain an ether bond, a sulfonyl bond, and/or hydroxy group.

When $R_3$ or $R_4$ contains a hydroxy group, the hydroxy group is preferably a tertiary alcohol.

Further, $R_3$ or $R_4$ has preferably from 1 to 10 carbon atoms in order to achieve high ion conductivity.

The structure of $R_3$ or $R_4$ is not particularly limited and it may contain a linear structure or cyclic structure.

In the electrolyte, polymer chains may be crosslinked via at least one of $R_3$ and $R_4$. The structure of the crosslinking group is not particularly limited and it may have various structures, depending on the purpose.

An example of an electrolyte represented by the formula (A), having the hydrophobic portion P' bonded to another hydrophobic portion P (—($CF_2$—$CF_2$)—), and having a crosslinked structure introduced via $R_3$ is shown in the formula (A'-1). In addition, an example of an electrolyte obtained by introducing, into the electrolyte represented by the formula (B), a crosslinked structure via $R_3$ and $R_4$ is shown in the formula (B'-1).

[Chemical formula 8]

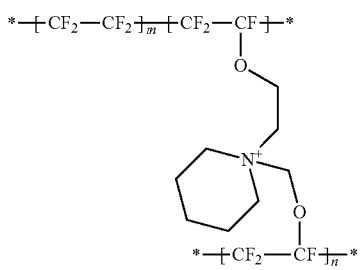

(A'-1)

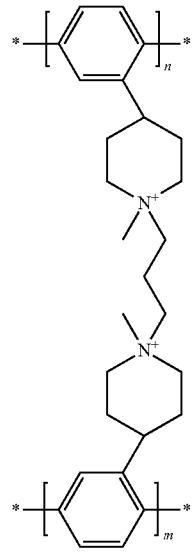

(B'-1)

[1.2.5. r, s, and u]

In the above formulas, r, s, and u each has a relationship with the number of constituent atoms of the ring.

In the formula (A), the greater the value of u, the greater the number of the constituent atoms of the ring. An excessive increase in the value of u leads to an increase in EW, causing reduction in ion conductivity. The value of u is therefore preferably 2 or greater but not greater than 9, more preferably 3 or greater but not greater than 6.

Due to a similar reason, the value of r+s in the formula (B) is preferably 1 or greater but not greater than 8, more preferably 2 or greater but not greater than 5.

[1.2.6. $X^-$]

$X^-$ represents a counter anion of a quaternary ammonium ion. The counter anion is not particularly limited and can be selected freely depending on the purpose. Specific examples of the counter anion include $OH^-$, $Cl^-$, $Br^-$, $I^-$, $(CF_3SO_2)_2N^-$, $CF_3SO_3^-$, $BF_4^-$, and $PF_6^-$.

[1.3. Specific Example 2]

As the second specific example of the electrolyte of the invention, electrolytes represented by the following formulas (C) and (D) are shown. The electrolytes represented by the formula (C) or (D) are each equipped with a structure in which a hydrophilic portion and a hydrophobic portion P are bonded to each other via a nitrogen atom of a cyclic quaternary ammonium salt. Another linking point to the hydrophobic portion P may be any atom of the ring.

In the electrolyte represented by the formula (C), the ring and the hydrophobic portion P are bonded to each other via the nitrogen atom of the ring and the carbon atom of the ring. In the electrolyte represented by the formula (D), on the other hand, the ring and the hydrophobic portion P are bonded to each other via two linking bonds which the nitrogen atom of the ring has.

[Chemical formula 9]

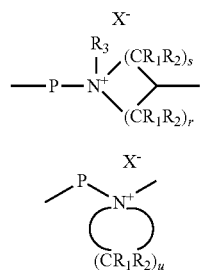

(C)

(D)

wherein,

P represents the hydrophobic portion, $R_1$ and $R_2$ each represents hydrogen, fluorine, a hydroxy group, or a hydrocarbon group or fluorinated hydrocarbon group having from 1 to 10 carbon atoms, and the hydrocarbon group or fluorinated hydrocarbon group constituting $R_1$ or $R_2$ may each contain an ether bond, a sulfonyl bond, and/or a hydroxy group, $R_3$ represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ may each contain an ether bond, a sulfonyl bond, and/or a hydroxy group, r and s each represents an integer of 0 or greater but not greater than 8 and satisfies $1 \le r+s \le 8$, u represents an integer satisfying $2 \le u \le 9$, and $X^-$ represents a counter anion.

In the formula (C), the greater the value of r+s, the greater the number of constituent atoms of the ring. An excessive increase in the value of r+s leads to an increase in EW, causing reduction in ion conductivity. The value of r+s is therefore preferably 1 or greater but not greater than 8, more preferably 2 or greater but not greater than 5.

Due to a similar reason, in the formula (D), the value of u is preferably 1 or greater but not greater than 9, more preferably 3 or greater but not greater than 6.

In the formulas (C) and (D), the hydrophobic portion P is preferably represented by any of the formulas (1.1) to (1.12).

It is to be noted that the second specific example is similar to the first specific example in:

(1) details of P, $R_1$ to $R_3$, and $X^-$ in the formulas (C) and (D), and (2) that the polymer chains may be crosslinked to each other via $R_3$ in the electrolyte represented by the formula (C), so that a detailed description on them is omitted.

[1.4. Specific Example 3]

As the third specific example of the electrolyte of the invention, electrolytes represented by the following formulas (E) to (G) are shown. The electrolytes represented by the formulas (E) to (G) are each equipped with a structure in which only the carbon atom of the cyclic quaternary ammonium salt is directly bonded to the hydrophobic portion P. The main chain is therefore composed of the hydrophobic portion P and some of carbon atoms constituting the ring.

In the electrolyte represented by the formula (E), the ring and the main chain have a carbon atom in common. In the electrolyte represented by the formula (F), the ring and the main chain have two carbon atoms in common. In the electrolyte represented by the formula (G), the ring and the main chain have (2+t) carbon atoms in common.

[Chemical formula 10]

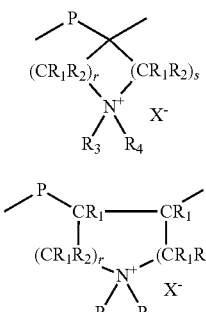

(E)

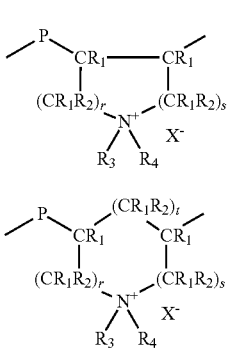

(F)

(G)

wherein,

P represents the hydrophobic portion, $R_1$ and $R_2$ each represents hydrogen, fluorine, a hydroxy group, or a hydrocarbon group or fluorinated hydrocarbon group having from 1 to 10 carbon atoms, and the hydrocarbon group or fluorinated hydrocarbon group constituting $R_1$ or $R_2$ may each contain an ether bond, a sulfonyl bond, and/or a hydroxy group, $R_3$ and $R_4$ each represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ or $R_4$ may each contain an ether bond, a sulfonyl bond, and/or a hydroxy group, r and s each represents an integer of 0 or greater but not greater than 8, t represents an integer of 1 or greater but not greater than 7, in the formula (E), r and s satisfy $1 \le r+s \le 8$, in the formula (F), r and s satisfy $0 \le r+s \le 7$, with the proviso that r and s do not represent 1 simultaneously, in the formula (G), r, s, and t satisfy $1 \le r+s+t \le 7$, with the proviso that r, s, and t do not represent 1 simultaneously, and $X^-$ represents a counter anion.

In the formula (E), the greater the value of (r+s), the greater the number of the constituent atoms of the ring. An excessive increase in the value of r+s leads to an increase in EW, causing a reduction in ion conductivity. The value of r+s is therefore preferably 1 or greater but not greater than 8, more preferably 2 or greater but not greater than 5.

Due to a similar reason, in the formula (F), the value of r+s is preferably 0 or greater but not greater than 7, more preferably 2 or greater but not greater than 4, still more preferably 3 or greater but not greater than 4.

Due to a similar reason, in the formula (G), the value of r+s+t is preferably 1 or greater but not greater than 7, more preferably 1 or greater but not greater than 4.

In the formulas (E) to (G), the hydrophobic portion P is preferably represented by any of the formulas (1.1) to (1.12).

It is to be noted that the third specific example is similar to the first specific example in:

(1) details of P, $R_1$ to $R_4$, and $X^-$ in the formulas (E) to (G), and (2) that the polymer chains may be crosslinked to each other via at least one of $R_3$ and $R_4$, so that a detailed description on them is omitted.

[2. Production Process of Electrolyte]

The electrolyte of the invention can be produced using various processes.

For the synthesis of a polymer equipped with the hydrophobic portion P and/or P', an ordinary polymerization process can be employed. Examples of the polymerization process include radical polymerization, plasma polymerization, graft polymerization, bulk polymerization, solution polymerization, suspension polymerization, emulsion polymerization, mini-emulsion polymerization, and micro-emulsion polymerization.

[2.1. Specific Example 1]

An example of the synthesis reaction of an electrolyte (A-1) which is one of the electrolytes represented by the formula (A) is shown in the following reaction formula (3.1). The electrolyte (R-1) can be obtained by quaternizing commercially-available 1-pyrrolidino-1-cyclohexene with MeI and then subjecting the resulting product to ring-opening metathesis reaction.

Another electrolyte (A) similar in structure to the electrolyte (A-1) can be produced in a similar manner to the one shown in the reaction formula (3.1).

[Chemical formula 11]

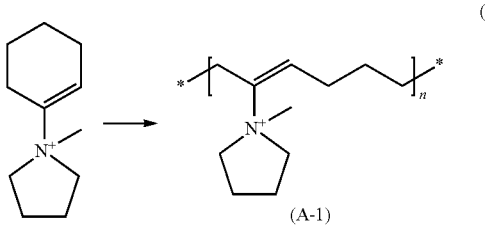

(3.1)

(A-1)

[2.2. Specific Example 2]

In the following reaction formula (3.2), an example of the synthesis reaction of an electrolyte (A-2) which is one of the electrolytes represented by the formula (A) is shown. First, an intermediate (A-21) is obtained by exposing polyethylene or polytetrafluoroethylene to electron beams and then, performing graft polymerization of 2-chloroethylvinyl ether. Then, the intermediate (A-21) is reacted with 1-methylpiperizine to obtain the electrolyte (A-2).

Another electrolyte (A) similar in structure to the electrolyte (A-2) can also be produced in a similar manner to the one represented by the reaction formula (3.2).

[Chemical formula 12]

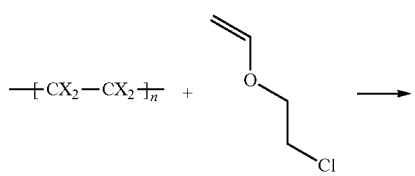

(3.2)

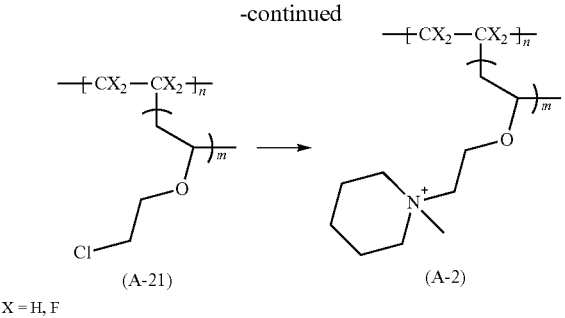

(A-21)    (A-2)

X = H, F

[2.3. Specific Example 3]

In the following reaction formula (3.3), an example of the synthesis reaction of an electrolyte (A-3) which is one of the electrolytes represented by the formula (A) is shown. The electrolyte (A-3) can be obtained by copolymerizing tetrafluoroethylene (TFE) or ethylene with Monomer (A-31) (refer to, for example, Macromolecules 2009, 42, 7689-7700).

Another electrolyte similar in structure to the electrolyte (A-3) can be produced in a similar manner to the one represented by the reaction formula (3.3).

[Chemical formula 13]

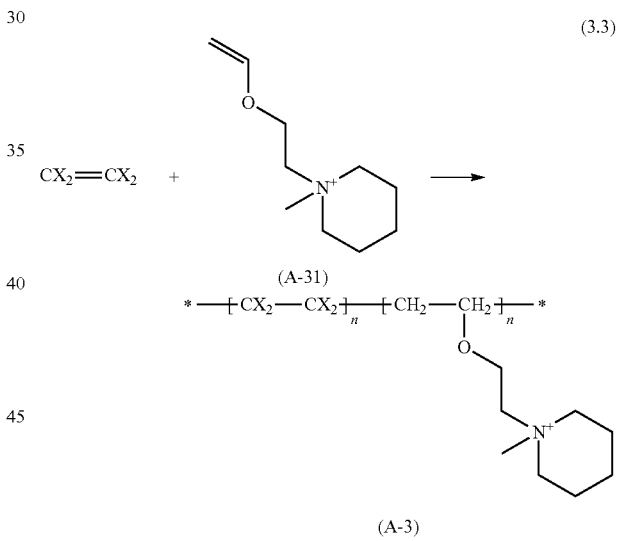

(3.3)

(A-31)

(A-3)

X = H, F

[2.4. Specific Example 4]

In the following reaction formula (3.4), an example of the synthesis reaction of an electrolyte (B-1) which is one of the electrolytes represented by the formula (B) is shown.

The electrolyte (B-1) can be obtained by:

(1) adding 1-methyl-4-piperidone to the aromatic ring of polyether ether sulfone (PEES), (2) quaternizing the nitrogen atom introduced in the resulting polymer with MeI, and (3) washing the polymer with KOH.

Another electrolyte (B) similar in structure to the electrolyte (B-1) can also be produced in a similar manner to the one represented by the reaction formula (3.4).

[Chemical formula 14]

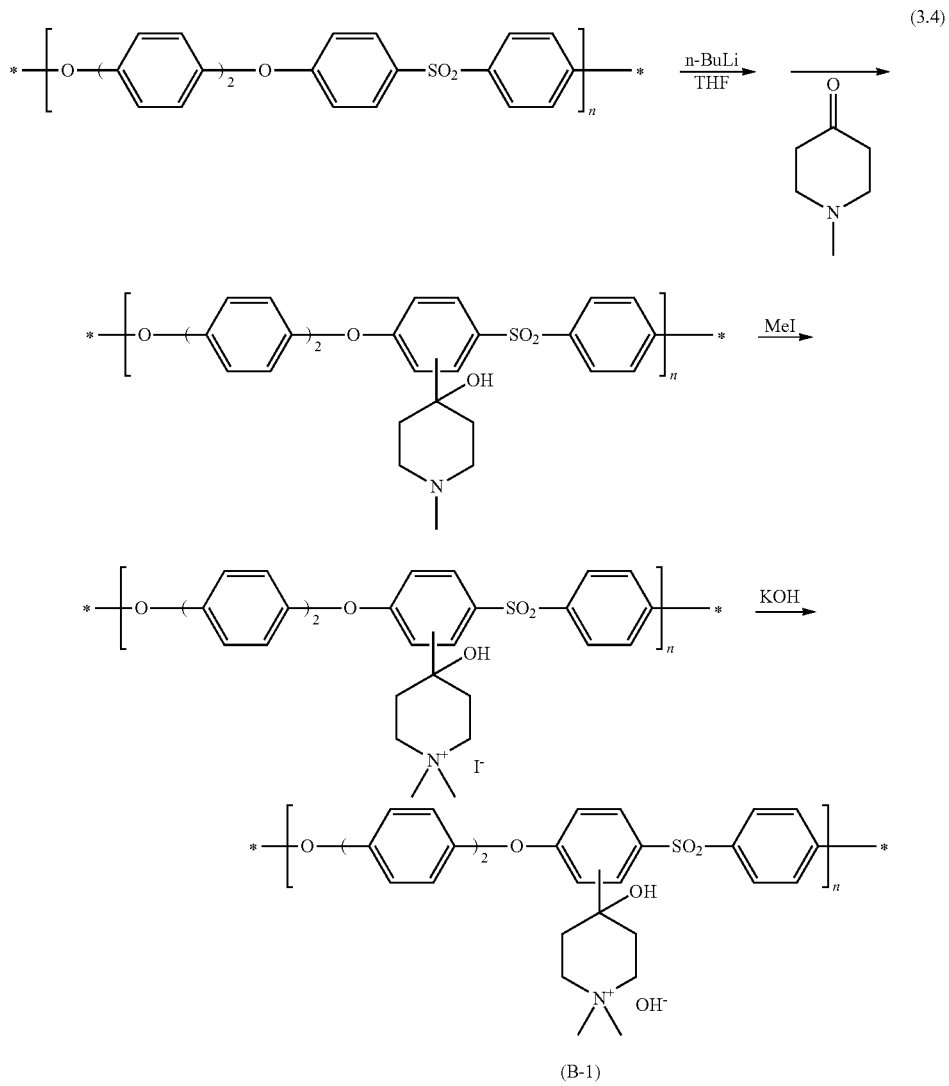

(B-1)

[2.5. Specific Example 5]

In the following reaction formula (3.5), an example of the synthesis reaction of an electrolyte (C-1) which is one of the electrolytes represented by the formula (C) is shown.

First, an intermediate (C-11) can be produced referring to the process described in a document (Journal of Fluorine Chemistry 2005, 126, 653-660). Then, the intermediate (C-11) and I(CH$_2$)$_4$I are reacted to yield a dimerized intermediate (C-12). The resulting intermediate (C-12) is then heated to cause crosslinking of the CF$_2$=CF portion. In such a manner, the electrolyte (C-1) can be obtained.

Another electrolyte (C) similar in structure to the electrolyte (C-1) can also be produced in a similar manner to the one represented by the reaction formula (3.5).

[Chemical formula 15]

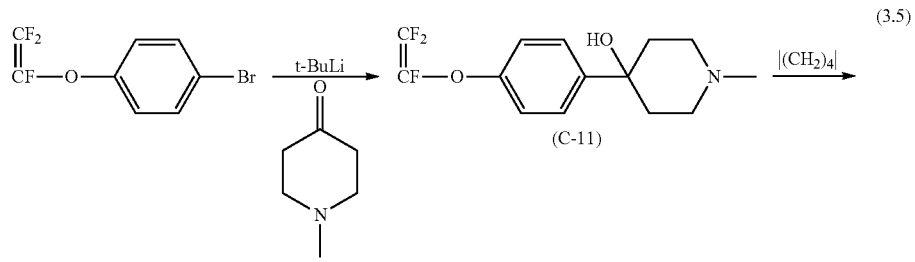

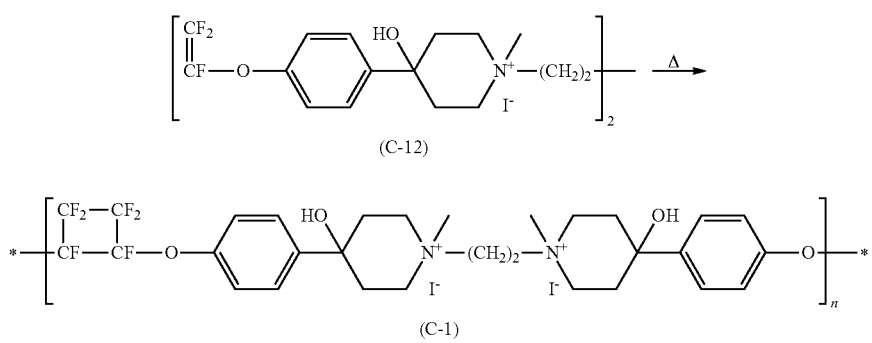

(C-12)

(C-1)

[2.6. Specific Example 6]

In the following reaction formula (3.6), an example of the synthesis reaction of an electrolyte (C-2) which is one of the electrolytes represented by the formula (C) is shown.

The electrolyte (C-2) can be obtained by:

(1) lithiating dibromobenzene with BuLi, (2) adding 1-methyl-4-piperidone to the resulting dibromobenzene to prepare an intermediate (C-21), and (3) adding a diiodoalkane to the intermediate (C-21).

Another electrolyte (C) similar in structure to the electrolyte (C-2) can also be produced in a similar manner to the one represented by the reaction formula (3.6).

[Chemical formula 16]

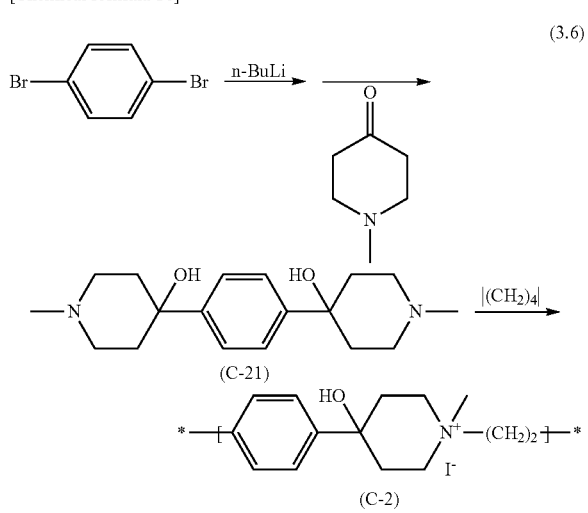

(3.6)

[2.7. Specific Example 7]

In the following reaction formula (3.7), an example of the synthesis reaction of an electrolyte (D-1) which is one of the electrolytes represented by the formula (D) is shown.

First, piperidine is reacted with NaH. Then, the reaction product is reacted with 0.5 equivalent of a dichloroalkane to obtain an intermediate (D-11). The intermediate (D-11) is reacted with a diiodoalkane to obtain the electrolyte (D-1).

Another electrolyte (D) similar in structure to the electrolyte (D-1) can also be produced in a similar manner to the one shown in the reaction formula (3.7).

[Chemical formula 17]

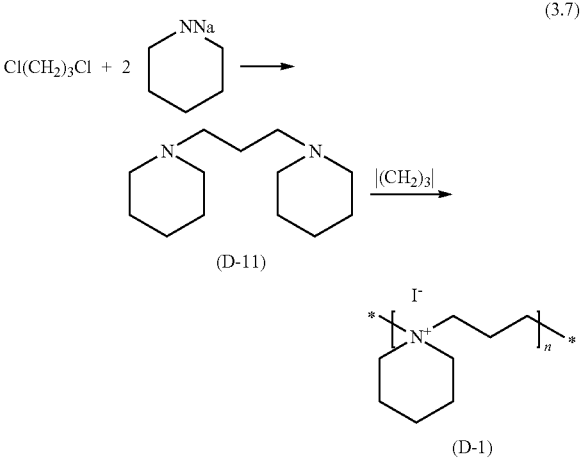

(3.7)

[2.8. Specific Example 8]

In the following reaction formula (3.8), an example of the synthesis reaction of an electrolyte (E-1) which is one of the electrolytes represented by the formula (E) is shown.

First, an intermediate (E-11) is prepared using the process described in a document (Journal of Organic Chemistry 2005, 70, 5528-5535). Then, the intermediate (E-11) is copolymerized with styrene to obtain the electrolyte (E-1).

Another electrolyte (E) similar in structure to the electrolyte (E-1) can also be produced in a similar manner to the one represented by the reaction formula (3.8).

[Chemical formula 18]

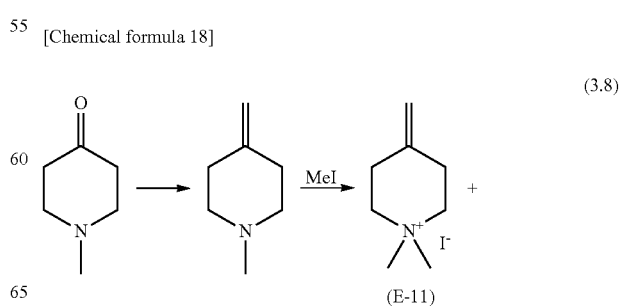

(3.8)

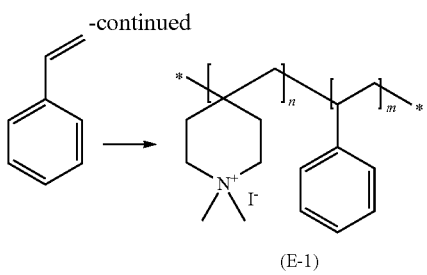

(E-1)

[2.9. Specific example 9]

In the following reaction formula (3.9), an example of the synthesis reaction of an electrolyte (F-1) which is one of electrolytes represented by the formula (F) is shown.

The electrolyte (F-1) can be obtained by oxidizing and thereby epoxidizing a commercially available compound and then subjecting the resulting compound to ring-opening polymerization.

Another electrolyte (F) similar in structure to the electrolyte (F-1) can also be produced in a similar manner to the one represented by the reaction formula (3.9).

[Chemical formula 19]

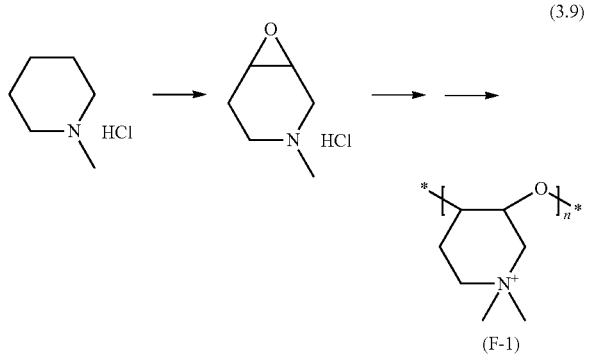

(3.9)

(F-1)

[2.10. Specific Example 10]

In the following reaction formula (3.10), an example of the synthesis reaction of an electrolyte (G-1) which is one of the electrolytes represented by the formula (G) is shown.

The electrolyte (G-1) can be obtained by subjecting a commercially available quaternary ammonium salt to ring-opening metathesis reaction.

Another electrolyte (G) similar in structure to the electrolyte (G-1) can also be produced in a similar manner to the one represented by the reaction formula (3.10).

[Chemical formula 20]

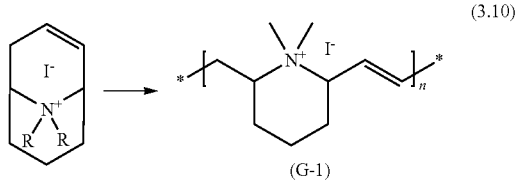

(3.10)

(G-1)

[2.11. Specific Example 11]

Various processes can be employed for the production of an electrolyte in which polymer chains are crosslinked to each other via $R_3$ or $R_4$ of the cyclic quaternary ammonium salt.

For example, the electrolyte (A'-1) described above can be obtained by preparing the electrolyte (A) having a tertiary amine introduced therein and having no crosslinked structure and then reacting the electrolyte (A) with an alkyl compound, such as 1,4-dichlorobutane or 1,4-diiodobutane, having two or more halogen sites in the molecule thereof.

In the above-described electrolyte (B'-1) or another electrolyte, polymer chains can be crosslinked in a similar manner to the one employed above.

[3. Fuel Cell, Li Secondary Battery, Secondary Battery and Primary Battery]

The fuel cell of the invention is characterized in that it uses the electrolyte of the invention. The electrolyte of the invention can be used as an electrolyte membrane of an alkaline fuel cell or an ionomer for a catalyst layer.

The Li secondary battery of the invention is characterized in that it uses the electrolyte of the invention. The electrolyte of the invention can be used as a solid electrolyte of a Li secondary battery.

The secondary battery of the invention is characterized in that it uses the electrolyte of the invention. The primary battery of the invention is characterized in that it uses the electrolyte of the invention. The electrolyte of the invention can be used as an electrolyte for a secondary battery or a primary battery.

It has been found that an alkaline solid electrolyte (AEM) having a cyclic ammonium salt as an ion conducting portion has durability against oxidation reaction. This suggests that there is a possibility of constructing batteries with high durability by applying the electrolyte to not only fuel cells or Li secondary batteries but also the primary batteries and storage batteries utilizing another metal.

For example, Zr-air secondary batteries using the electrolyte of the invention are presumed to have improved durability in the air because the electrolyte of the invention has higher resistance to oxidation than ordinary AEM. The metal on the anode side of the air battery is, for example, Ca, Mg, Zn, Fe, or Al.

[4. Effects of Electrolyte, Fuel Cell, Li Secondary Battery, Secondary Battery and Primary Battery]

The electrolyte of the invention has a cyclic quaternary ammonium salt so that it exhibits relatively high hydroxide ion conductivity. In addition, the ion conductor portion has a cyclic structure so that the electrolyte has high durability. Use of this electrolyte for an alkaline fuel cell or Li secondary battery can therefore realize improvement in output, improvement in durability, or cost reduction.

The ordinary alkaline electrolyte has, as shown in the left side of the reaction formula (4.1), a quaternary ammonium salt structure bonded at a benzyl position. The alkaline electrolyte having such a structure is, however, likely to cause thermal decomposition at a benzyl position, leading to elimination of an ionic group.

An alkaline electrolyte having a cyclic quaternary ammonium salt as shown in the left side of the reaction formula (4.2) is resistant to oxidation compared with the alkaline electrolyte having a benzyl quaternary ammonium salt structure. Even if such an electrolyte is used in an oxidizing atmosphere, elimination of an ionic group does not occur easily as shown in the reaction formula (4.2). As a result, the alkaline electrolyte having a cyclic quaternary ammonium salt can keep hydroxide ion conductivity for a prolonged period of time even in the presence of both hydrazine and oxygen.

[Chemical formula 21]

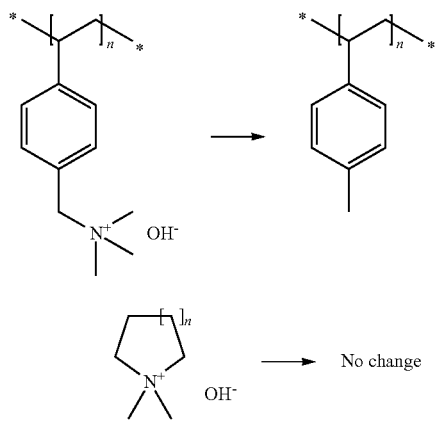

EXAMPLES

Example 1

1. Preparation of Sample

An electrolyte (B-1) was obtained in accordance with the reaction formula (3.4). Described specifically, PEES (500 mg) was dissolved in THF (20 mL). To the resulting solution was added 1.2 equivalent of n-BuLi (0.6 mL) at −80° C. To the resulting mixture was added dropwise 1-methyl-4-piperidone (0.15 mL). The reaction mixture was heated gradually to room temperature and then, stirred overnight. The polymer thus obtained was washed with water.

Then, MeI (0.2 mL) was added to the THF solution (20 mL) of the polymer to quaternize the nitrogen, followed by washing with KOH to obtain a target polymer (612 mg).

2. Results

From the $^1$H NMR spectrum of the polymer thus obtained, the polymer was identified as the electrolyte (B-1).

Example 2

1. Test Method

Based on theoretical calculation, the HOMO (highest occupied molecular orbital) level and the LUMO (lowest occupied molecular orbital) level of various quaternary ammonium salts were determined. The term "HOMO level" means an energy required for withdrawing an electron from a molecule. When the HOMO level is low, an electron is not likely to be withdrawn (the molecule is resistant to oxidation). The term "LUMO level" means an energy required for a molecule to accept an electron. When the LUMO level is low, the molecule accepts an electron therein easily.

2. Results

FIG. 1 shows the HOMO level and the LUMO level of various model compounds determined based on theoretical calculation. It is apparent from FIG. 1 that the HOMO level of the cyclic quaternary ammonium salts (E' and F') is lower than that of the other model compounds and at the same time, the LUMO level of them is higher than that of the other model compounds. This suggests that the cyclic quaternary ammonium salts (E' and F') are resistant to oxidation.

Referential Example 1

1. Test Method

Various quaternary ammonium salts having a low molecular weight were each dissolved in an aqueous solution containing hydrazine and/or KOH. The resulting solutions were heated at 80° C. for 24 hours in an oxygen atmosphere (with the proviso that only the solution of Test No. 5 was heated in a nitrogen atmosphere). A hydrazine concentration in the solution was set at 20 wt %, while a KOH concentration was set at 5 wt %.

The amounts of the quaternary ammonium salt in the solution before and after heating were measured using 1N NMR spectrum in accordance with the internal standard method, with pyridine as the internal standard. From the amount $W_0$ of the quaternary ammonium salt before the test and the remaining amount $W_1$ after the test, a residual ratio (=$W_1 \times 100/W_0$ (%)) was determined.

2. Results

The results are shown in Table 1. Compounds A to showed about 10% to 50% decomposition in the presence of oxygen and hydrazine irrespective of the presence or absence of KOH. On the other hand, Compounds E and F showed almost no decomposition even in the presence of oxygen and hydrazine.

TABLE 1

| Test | Salt | Hydrazine | KOH | Residual ratio (%) |
|------|------|-----------|-----|--------------------|
| 1  | A | ○ | x | 85 |
| 2  | A | ○ | ○ | 54 |
| 3  | B | ○ | x | 93 |
| 4  | B | ○ | ○ | 89 |
| 5  | B | ○ | x | 100 (in $N_2$) |
| 6  | B | x | ○ | 100 |
| 7  | C | ○ | x | 83 |
| 8  | C | ○ | ○ | 82 |
| 9  | D | ○ | x | 93 |
| 10 | D | ○ | ○ | 95 |
| 11 | E | ○ | x | 100 |
| 13 | E | ○ | ○ | 100 |
| 12 | F | ○ | x | 100 |
| 14 | F | ○ | ○ | 100 |

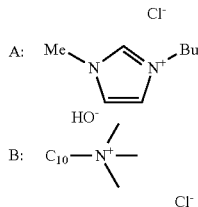

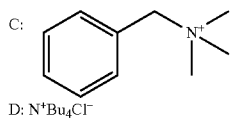

D: $N^+Bu_4Cl^-$

TABLE 1-continued

| Test | Salt | Hydrazine | KOH | Residual ratio (%) |
|------|------|-----------|-----|---------------------|

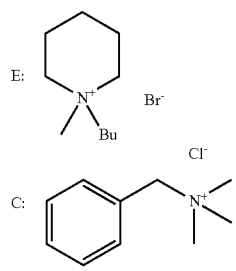

o: Present,
x: Absent

Example 3

1. Test Method

A quaternary ammonium salt having a low molecular weight was dissolved in 5 mL of a 3% $H_2O_2$ aqueous solution added with $FeCl_2$ and the resulting solution was heated at 80° C. for one hour (Fenton's test).

The amounts of the quaternary ammonium salt in the solution before and after heating were measured using the $^1H$ NMR spectrum in accordance with the internal standard method, with pyridine as an internal standard. From the amount $W_0$ of the quaternary ammonium salt before the test and the remaining amount $W_1$ after the test, a residual ratio ($=W_1 \times 100/W_0(\%)$) was determined. The quaternary ammonium salts C and E are the same as those defined in Table 1.

2. Results

The residual ratio is shown in Table 2. Compound C showed almost 50% decomposition, while the residual ratio of Compound E is about 90%, suggesting that the compounds are resistant to decomposition under the above conditions.

TABLE 2

| | Salt | Residual Ratio (%) |
|---|------|---------------------|
| 1 | C | 54 |
| 2 | E | 89 |

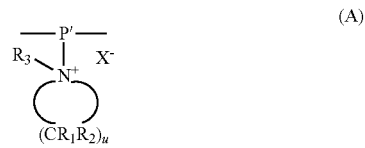

Example 4

1. Preparation of Sample

In a similar manner to Example 1 except that 2 equivalent of n-BuLi was added, treatment was performed. To the resulting polymer solution was added MeI to quaternize the nitrogen to obtain a target polymer.

The electrolyte thus obtained was dissolved in NMP to form a cast film. A step of immersing the cast film thus obtained in a 1N NaOH aqueous solution for one hour and then washing it with ultrapure water was repeated twice.

In a similar manner, an electrolyte membrane was prepared using the electrolyte obtained in Example 1.

2. Results

The $OH^-$ conductivity of the electrolyte membranes obtained in Examples 1 and 4 was measured. The results are shown in Table 3.

TABLE 3

| | $OH^-$ conductivity (mS/cm) |
|---|------------------------------|
| Example 1 | 3 |
| Example 4 | 27 |

Embodiments of the invention were described specifically. It is to be noted, however, that the invention is not limited to or by these embodiments and can be modified without departing from the gist of the invention.

The electrolyte of the invention can be used for electrolyte membranes of an alkaline fuel cell, ionomers for catalytic layer, and solid electrolytes of a Li secondary battery, a secondary battery and a primary battery.

The electrolyte of the invention can also be used as an electrolyte for various electrochemical devices such as water electrolytic devices, hydrohalic acid electrolytic devices, salt electrolytic devices, oxygen and/or hydrogen concentrators, humidity sensors, and gas sensors.

The invention claimed is:

1. An electrolyte comprising a polymer electrolyte having a hydrophilic portion having a cyclic quaternary ammonium salt and a hydrophobic portion bonded to the hydrophilic portion, the polymer electrolyte having a structure represented by one or more of the following formulas (A) to (G):

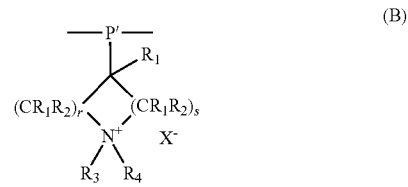 (A)

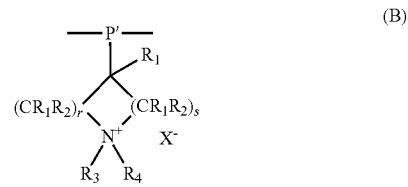 (B)

(B)

wherein
P' represents the hydrophobic portion,
$R_1$ and $R_2$ each represents hydrogen, fluorine, a hydroxy group, or a hydrocarbon group or fluorinated hydrocarbon group having from 1 to 10 carbon atoms, and the hydrocarbon group or fluorinated hydrocarbon group constituting $R_1$ or $R_2$ may each contain an ether bond, a sulfonyl bond, and/or a hydroxy group, $R_3$ and $R_4$ each represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ or $R_4$ may each contain an ether bond, a sulfonyl bond, and/or a hydroxy group, r and s each represents an integer of 0 or greater but not greater than 8 and satisfies $1 \leq r+s \leq 8$, u represents an integer satisfying $2 \leq u \leq 9$, and $X^-$ represents a counter anion;

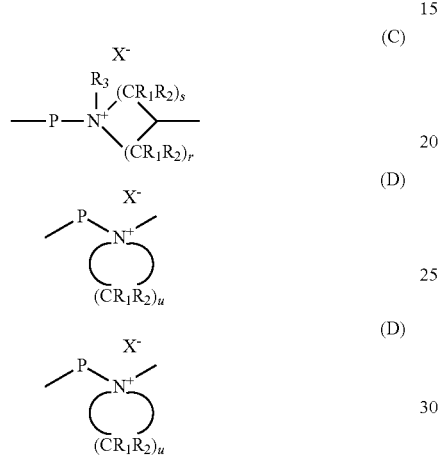

(C)

(D)

(D)

wherein

P represents the hydrophobic portion, $R_1$ and $R_2$ each represents hydrogen, fluorine, a hydroxy group, or a hydrocarbon group or fluorinated hydrocarbon group having 1 to 10 carbon atoms, and the hydrocarbon group or fluorinated hydrocarbon group constituting $R_1$ or $R_2$ may each contain an ether bond, a sulfonyl bond, and/or a hydroxy group, $R_3$ represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ may each contain an ether bond, a sulfonyl bond, and/or a hydroxy group, r and s each represents an integer of 0 or greater but not greater than 8 and satisfies $1 \leq r+s \leq 8$, u represents an integer satisfying $2 \leq u \leq 9$, and $X^-$ represents a counter anion;

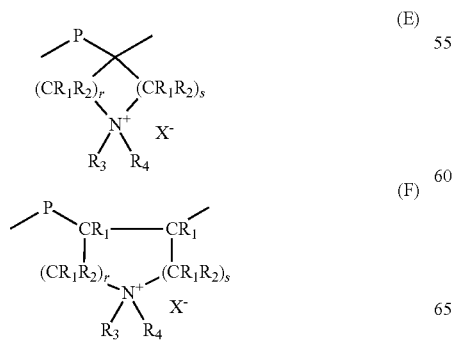

(E)

(F)

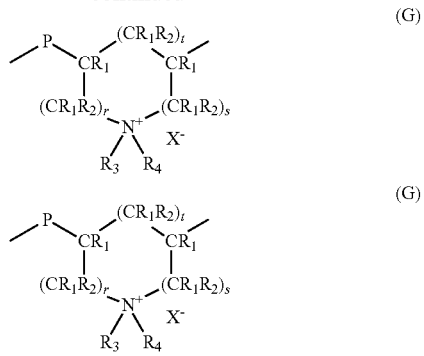

(G)

(G)

wherein

P represents the hydrophobic portion, $R_1$ and $R_2$ each represents hydrogen, fluorine, a hydroxy group, or a hydrocarbon group or fluorinated hydrocarbon group having from 1 to 10 carbon atoms, and the hydrocarbon group or fluorinated hydrocarbon group constituting $R_1$ or $R_2$ may each contain an ether bond, a sulfonyl bond, and/or a hydroxy group, $R_3$ and $R_4$ each represents a hydrocarbon group, fluorinated hydrocarbon group, or fluorocarbon group having from 1 to 10 carbon atoms, and the hydrocarbon group, fluorinated hydrocarbon group, or fluorocarbon group constituting $R_3$ or $R_4$ may each contain an ether bond, a sulfonyl bond, and/or a hydroxy group, r and s each represents an integer of 0 or greater but not greater than 8, t represents an integer of 1 or greater but not greater than 7, in the formula (E), r and s satisfy $1 \leq r+s \leq 8$, in the formula (F), r and s satisfy $0 \leq r+s \leq 7$, with the proviso that r and s do not represent 1 simultaneously, in the formula (G), r, s, and t satisfy $1 \leq r+s+t \leq 7$, with the proviso that r, s, and t do not represent 1 simultaneously, and $X^-$ represents a counter anion;

with the proviso that an electrolyte used for hydrazine fuel cells is excluded.

2. The electrolyte according to claim 1, the polymer electrolyte having the structure represented by the formula (A) or formula (B), wherein the hydrophobic portion P' has a structure represented by one or more of the following formulas (2.1) to (2.6):

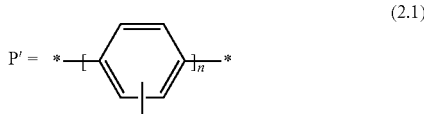

(2.1)

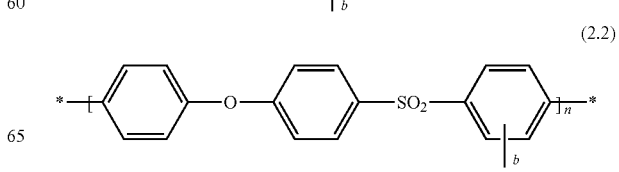

(2.2)

(2.3)
$$*\text{-}(CF_2\text{-}CF)_n\text{-}*$$
$$|\text{Y}$$
$$(CH_2)_m$$

(2.4)
$$*\text{-}(CH_2\text{-}CH)_n\text{-}*$$
$$|\text{Y}$$
$$(CH_2)_m$$

(2.5)
$$*\text{-}(CH_2\text{-}CH)_n\text{-}*$$
with phenyl substituted with $b$ (2.6)
$$*\text{-}(C=CH)_n\text{-}*$$
$$|\text{Y}$$
$$(CH_2)_m$$

(2.6)
$$*\text{-}(C=CH)_n\text{-}*$$
$$|\text{Y}$$
$$(CH_2)_m$$

wherein n represents an integer of 1 or greater, m represents an integer of 0 or greater, Y represents a direct bond or an oxygen atom, and b represents an integer of 1 or greater but not greater than 4.

3. The electrolyte according to claim 1, the polymer electrolyte having the structure represented by the formula (A) or formula (B), further comprising a hydrophobic portion P bonded to the hydrophobic portion P'.

4. The electrolyte according to claim 1, wherein the hydrophobic portion P of the polymer electrolyte has a structure represented by one or more of the following formulas (1.1) to (1.12):

(1.1)
$$P = *\text{-}(CH_2\text{-}CH_2)_p\text{-}*$$

(1.2)
$$*\text{-}(\text{C}_6\text{H}_4)_p\text{-}*$$

(1.3)
$$*\text{-}(\text{C}_6\text{H}_4\text{-}O\text{-}\text{C}_6\text{H}_4\text{-}SO_2\text{-}\text{C}_6\text{H}_4\text{-}O)_p\text{-}*$$

(1.4)
$$*\text{-}(\text{C}_6\text{H}_4\text{-}O\text{-}\text{C}_6\text{H}_4\text{-}CO\text{-}\text{C}_6\text{H}_4\text{-}O)_p\text{-}*$$

(1.5)
$$*\text{-}(\text{C}_6\text{H}_4\text{-}O\text{-}CF(CF_2\text{-}CF_2)\text{-}CF\text{-}O\text{-}\text{C}_6\text{H}_4)_p\text{-}*$$

(1.6)
$$*\text{-}(CF_2\text{-}CF_2)_p\text{-}*$$

(1.7)
$$*\text{-}(\text{C}_6\text{H}_4\text{-}C(CF_3)_2\text{-}\text{C}_6\text{H}_4)_p\text{-}*$$

(1.8)
cyclohexyl-O repeat unit $_p$ (1.9)
$$*\text{-}(CH_2\text{-}CH(C_6H_5))_p\text{-}*$$

(1.10)
—O—

(1.11)
—SO$_2$—

(1.12)
$$*\text{-}(CH=CH)_p\text{-}*$$

(1.12)
$$*\text{-}(CH=CH)_p\text{-}*$$

wherein, p represents an integer of 1 or greater.

5. The electrolyte according to claim 1, wherein polymer chains of the polymer electrolyte are crosslinked to each other via at least one of the $R_3$ and $R_4$.

6. A fuel cell comprising the electrolyte as claimed in claim 1.

7. A Li secondary battery comprising the electrolyte as claimed in claim 1.

8. A secondary battery comprising the electrolyte as claimed in claim 1.

9. A primary battery comprising the electrolyte as claimed in claim 1.

10. The electrolyte according to claim 2, wherein the hydrophobic portion P of the polymer electrolyte has a structure represented by one or more of the following formulas (1.1) to (1.12):

(1.1)
$$P' = *\text{-}(CH_2\text{-}CH_2)_p\text{-}*$$

(1.2)
$$*\text{-}(\text{C}_6\text{H}_4)_p\text{-}*$$

-continued
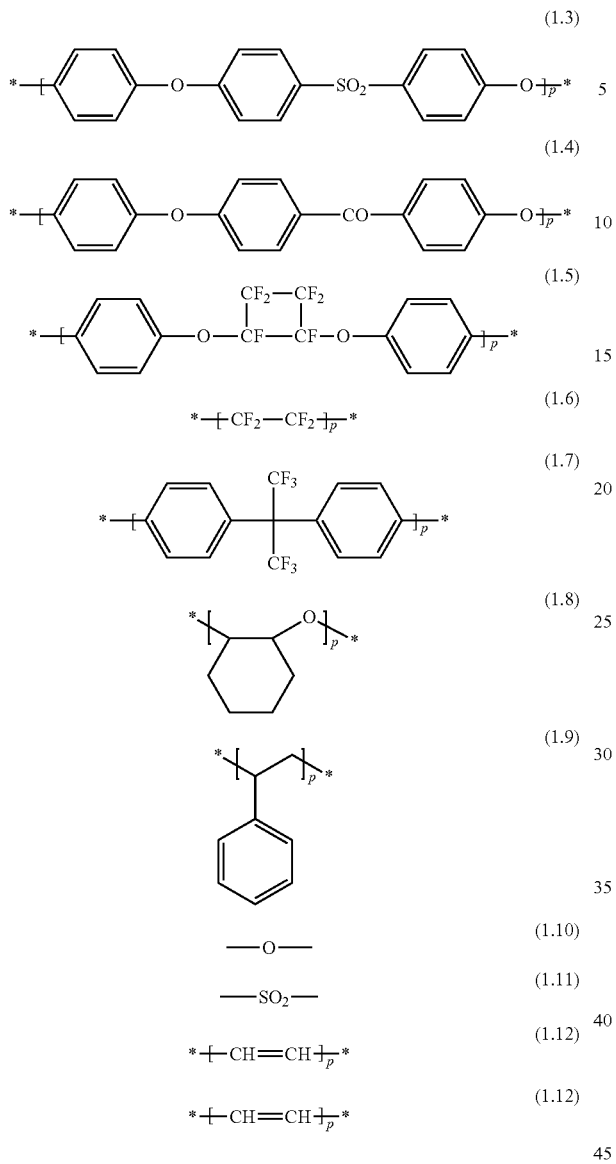
wherein, p represents an integer of 1 or greater.
11. The electrolyte according to claim 3, wherein the hydrophobic portion P of the polymer electrolyte has a structure represented by one or more of the following formulas (1.1) to (1.12):
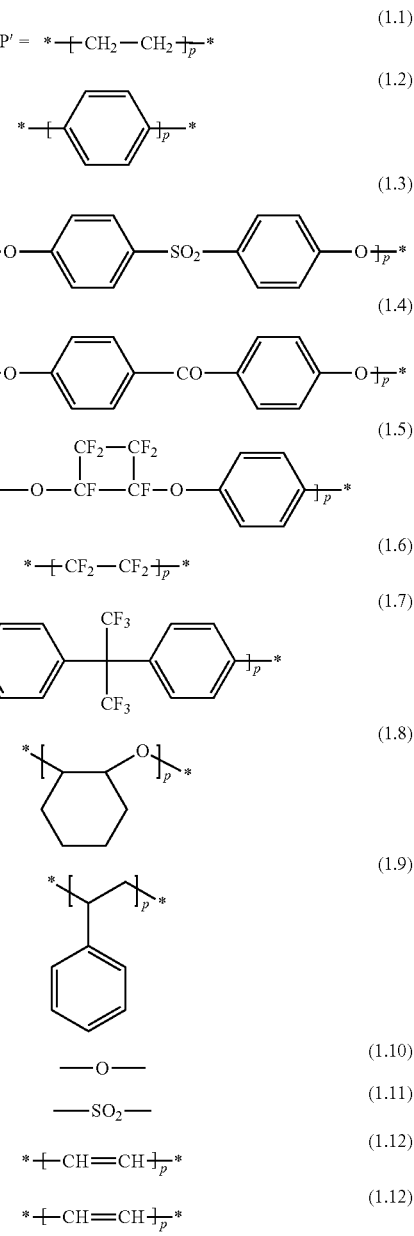
wherein, p represents an integer of 1 or greater.
* * * * *